United States Patent
Mashima et al.

(10) Patent No.: US 7,659,855 B2
(45) Date of Patent: Feb. 9, 2010

(54) FOLDABLE PORTABLE RADIO DEVICE

(75) Inventors: Nobuharu Mashima, Toyama (JP); Yutaka Saito, Ishikawa (JP); Hideo Nakanishi, Kanagawa (JP); Kenichi Yamada, Kanagawa (JP)

(73) Assignee: Panasonic Corporation, Kadoma-shi (JP)

( * ) Notice: Subject to any disclaimer, the term of this patent is extended or adjusted under 35 U.S.C. 154(b) by 424 days.

(21) Appl. No.: 10/597,679

(22) PCT Filed: Dec. 9, 2005

(86) PCT No.: PCT/JP2005/022681

§ 371 (c)(1),
(2), (4) Date: Aug. 3, 2006

(87) PCT Pub. No.: WO2006/062198

PCT Pub. Date: Jun. 15, 2006

(65) Prior Publication Data

US 2008/0143609 A1    Jun. 19, 2008

(30) Foreign Application Priority Data

Dec. 10, 2004    (JP)    ............................ 2004-358664

(51) Int. Cl.
*H01Q 1/24*    (2006.01)

(52) U.S. Cl. .................. 343/702; 343/795; 343/846; 343/876; 455/575.7

(58) Field of Classification Search ............... 343/702, 343/724, 795, 846, 876; 455/575.7
See application file for complete search history.

(56) References Cited

U.S. PATENT DOCUMENTS 7,225,004 B2 *    5/2007    Saito et al. ............... 455/575.7

FOREIGN PATENT DOCUMENTS

| JP | 2003-158468 | 5/2003 |
|---|---|---|
| JP | 2003-283621 | 10/2003 |
| JP | 2004-056426 | 2/2004 |
| JP | 2004-064302 | 2/2004 |
| JP | 2004-134976 | 4/2004 |
| JP | 2004-179995 | 6/2004 |
| JP | 2004-208219 | 7/2004 |
| JP | 2004-229048 | 8/2004 |
| JP | 2004-242005 | 8/2004 |
| JP | 2005-039696 | 2/2005 |

* cited by examiner

*Primary Examiner*—Michael C Wimer
(74) *Attorney, Agent, or Firm*—Christensen O'Connor Johnson Kindness PLLC

(57) ABSTRACT

Regardless of a user's hand holding condition, it is possible to obtain excellent antenna performance in both of folded and unfolded calling conditions.

A folder type mobile radio apparatus includes an upper case 1301 having a first antenna element made of a metal plate 1305, a lower case 1302 having a second antenna element made of a circuit board 102, a hinge portion 1303 pivotably connecting the upper and lower cases 1301 and 1302, a first circuit board 101 having a ground pattern provided in an end side near the hinge portion 1303 in the lower case, an antenna switching unit 103 for selecting one of a first feed means for feeding the first antenna element for the radio circuit 1314 on the first circuit board 101 or a second feed means for feeding the second antenna element.

12 Claims, 14 Drawing Sheets

US 7,659,855 B2

FOLDABLE PORTABLE RADIO DEVICE

TECHNICAL FIELD

The present invention relates to an antenna of a mobile radio apparatus, and more particularly, to a folder type mobile radio apparatus having superior performance in either of a folded state or a state when a user holds it by a user's hand for use.

BACKGROUND ART

An antenna installed in a mobile radio apparatus may produce degraded performance due to electrical interaction between a user's hand and the antenna in a state when a user holds it by the user's hand for use. Particularly, in an antenna installed outside the mobile radio apparatus, such as a helical antenna, the antenna performance is further deteriorated due to the significant electrical interaction when the user's hand is disposed near the antenna or a feed part in a state when the user holds it by the user's hand for use.

This is because, if the user's hand is disposed near the antenna or the feed part, the resonant frequency as well as the antenna impedance may vary, so that a mismatching loss increases in a measurement frequency. How to reduce such electrical interaction is a design issue of an antenna in a mobile radio apparatus industry.

Further to the aforementioned problem, as shown in the Patent Document 1, a method of improving the mismatching loss by optimizing the matching condition of the antenna disposed outside the mobile radio apparatus when a user's hand is disposed near the antenna has been conceived.

As an another example, a method of using a metal portion of upper and lower casings in a folder type mobile radio apparatus as an antenna has been proposed.

This folder type mobile radio apparatus includes, as shown in FIG. 14, upper and lower casings 1301 and 1302 connected with each other by a hinge portion 1303. The upper and lower cases 1301 and 1302 are pivoted on the hinge portion 1303 to change between the folded and unfolded states. In addition, the upper and low cases 1301 and 1302 are made of a plastic material which is an insulating resin.

A metal frame 1305 is provided on a plane where a display element 1304 of the upper case 1301 is disposed. Typically, the metal frame 1305 is made of a kind of metal such as magnesium alloy having high conductivity, light weight, and high mechanical strength. This allows the upper case 1301 having a thin plate shape to function as an antenna element as well as obtain necessary mechanical strength. The longer side of the metal frame has a length L1 of, for example, about 90 mm.

The metal frame 1305 and the metal hinge 1306 are attached to the upper case 1301 by a mounting screw 1307, so that the metal frame 1305 and the metal hinge 1306 are electrically connected, and the upper case 1301 and the metal hinge 1306 are mechanically fixed.

The metal hinge 1306 and the metal hinge 1308 are pivotably connected around a pivot axis 1309 also functioning as a connecting means. The metal hinges 1306 and 1308, and the pivot 1309 are made of conductive metal, and electrically connected with one another at respective contact points. The metal hinges 1306 and 1308, and the pivot 1309 constitute a hinge portion 1303.

A part of the metal hinge 1308 and the feed terminal 1310 are attached to the lower case 1302 by a mounting screw 1311, so that the metal hinge 1308 and the feed terminal 1310 are electrically connected, and the lower case 1302 and the metal hinge 1308 are mechanically fixed.

The feed terminal 1310 is connected to the wireless circuit 1314 through a matching circuit 1313 on a circuit board 1312 installed in the lower case 1302. The circuit board 1312 is a printed board on which circuit elements for implementing various functions of the mobile radio apparatus are mounted, and has a ground pattern formed on its almost entire surface to serve as a ground voltage of the circuit.

The folder type mobile radio apparatus having the aforementioned antenna provides improved antenna performance in comparison with the helical antenna mounted on an external portion and allows the electrical interaction with a user's hand to be reduced. Therefore, it is possible to obtain excellent antenna performance even in a state when a user holds the mobile radio apparatus by the user's hand for use.

Patent Document 1: JP-A-2003-158468.

DISCLOSURE OF THE INVENTION

Problems to be Solved by the Invention

However, the aforementioned construction having the antenna matching circuit optimized when a user's hand is disposed near the antenna has problems in that the antenna performance is degraded when a user's hand is not disposed near the antenna and the improvement may be negligible because only the matching circuit is optimized.

In addition, the aforementioned construction having a metal portion provided in upper and lower casings as shown in the drawing has problems in that the antenna performance is slightly degraded when a user's hand is disposed near the feed part of the antenna, and further degraded in a folded state.

The present invention is contrived to solve the aforementioned problems, and an object thereof is to provide a folder type mobile radio apparatus capable of obtaining excellent antenna performance in either folded or unfolded states.

Means for Solving the Problems

In order to achieve the aforementioned object, the folder type mobile radio apparatus according to the present invention comprises a first antenna element provided in a first casing, a second casing pivotably connected to the first casing through a hinge portion, a circuit board having a ground pattern provided in an end side, which is near the hinge portion, of the second casing, a second antenna element provided in another end side, which is opposite to the hinge portion, of the second casing, a first feed means for feeding the first antenna element from a radio circuit on the circuit board, a second feed means for feeding the second antenna element from the radio circuit on the circuit board, and a switching means for selecting one of the first feed means and the second feed means, wherein the first antenna element and the ground pattern on the circuit board operate as a dipole antenna when the first feed means is selected, and wherein the second antenna element and the ground pattern on the circuit board operate as a dipole antenna when the second feed means is selected. According to this construction, it is possible to obtain excellent antenna performance even in any calling condition when a user's hand is disposed near.

The present invention is characterized in that the ground pattern on the circuit board is disposed in a hinge portion side of the second casing with substantially a half area of the second casing, wherein the second antenna element is disposed in an opposite side from the hinge portion of the second casing with substantially a half area of the second casing, and wherein the second antenna element is spaced from the ground pattern on the circuit board with a predetermined interval, and electrically connected to the second feed means on the circuit board. According to this construction, in a real mobile radio apparatus construction, it is possible to obtain excellent antenna performance even in a calling condition that a user's hand is disposed near.

The present invention is characterized in that the hinge portion includes a first hinge portion and a second hinge portion comprising conductive metal, and a connecting portion for electrically connecting and pivotably supporting the first hinge portion and the second hinge portion, wherein the first hinge portion is provided in the first casing, and electrically connected to an end portion of the first antenna element, wherein the second hinge portion is provided in the second casing, spaced from the ground pattern on the circuit board with a predetermined interval, and electrically connected to the first feed means on the circuit board, and wherein the first antenna element, the hinge portion, and the ground pattern on the circuit board operate as a dipole antenna when the first feed means is selected. According to this construction, it is possible to obtain effect capable of realizing a stable feed construction with a low cost without using a special component by adopting a hinge portion that can be pivoted.

The present invention is characterized in that the second antenna element comprises a copper foil pattern on the circuit board. According to this construction, it is possible to obtain effect of reducing cost due to the reduction of the number of components and the number of processes by adopting a copper foil on the circuit board as an antenna element.

In addition, in the second casing, an inductance element is inserted into a circuit for connecting an electronic circuit provided in a circuit board side with an electronic circuit provided in a second antenna element side, and the inductance element is arranged in an interval between the ground pattern on the circuit board and the second antenna. According to this construction, it is possible to obtain effect of improving performance of the second antenna in addition to maintain the performance of the first antenna element.

Furthermore, the present invention is characterized in that the folder type mobile radio apparatus comprises a folding/unfolding detection means for detecting a folded/unfolded condition of the first casing and the second casing, the switching means is controlled based on a detection result from the folding/unfolding detection means, the first feed means is selected when the first casing and the second casing are unfolded, and the second feed means is selected when the first casing and the second casing are folded. According to this construction, it is possible to obtain excellent antenna performance even when the first casing and the second casing are folded.

Still furthermore, the present invention is characterized in that the folder type mobile radio apparatus comprises a holding position detection means for detecting a positional relation between the second casing and a user's hand holding the mobile radio apparatus, wherein the switching means is controlled based on a detection result from the holding position detection means, wherein the first feed means is selected when the second antenna element side is held by a hand, and the second feed means is selected when the hinge portion side is held by a hand. According to this construction, it is possible to always obtain excellent antenna performance even when the holding position is changed.

Still furthermore, the present invention is characterized in that the folder type mobile radio apparatus comprises a folding/unfolding detection means for detecting a folded/unfolded condition of the first casing and the second casing, wherein the switching means is controlled based on a detection result from the folding/unfolding detection means, and one of the first feed means and the second feed means is forcibly selected when the first casing and the second casing are folded. According to this construction, it is possible to select an optical antenna in a folded state regardless of which antenna is selected in an unfolded state of the first casing and the second casing. Therefore, it is possible to always obtain excellent antenna performance in a folded state.

Moreover, the present invention is characterized in that the folder type mobile radio apparatus comprises one of an optical sensor, a temperature sensor, or an electrostatic sensor as the holding position detection means. According to this construction, it is possible to always detect a positional relation between a user's hand holding the mobile radio apparatus and the second casing. Therefore, it is possible to always obtain excellent antenna performance even when the holding position is changed.

In addition, the present invention is characterized in that a feed means having higher transmission quality is always selected by comparing transmission quality of the radio circuit as a method of controlling the switching means. According to this construction, it is possible to always obtain high quality of a calling.

In addition, the present invention is characterized in that a feed means having a higher received electric field intensity is always selected by comparing a received electric field intensity of the radio circuit. According to this construction, it is possible to always obtain excellent antenna performance by selecting an antenna based on a practical use environment.

In addition, the present invention is characterized in a means for dividing power to feed the first feed means and the second feed means. According to this construction, it is possible to always obtain excellent antenna performance without using the switching means.

EFFECT OF THE INVENTION

As described above, according to the folder type mobile radio apparatus according to the present invention, it is possible to obtain excellent antenna performance in either of a calling state that the first casing and the second casing are unfolded or a folded state that the first casing and second casing are folded.

DESCRIPTION OF REFERENCE NUMERALS

Figure 1:
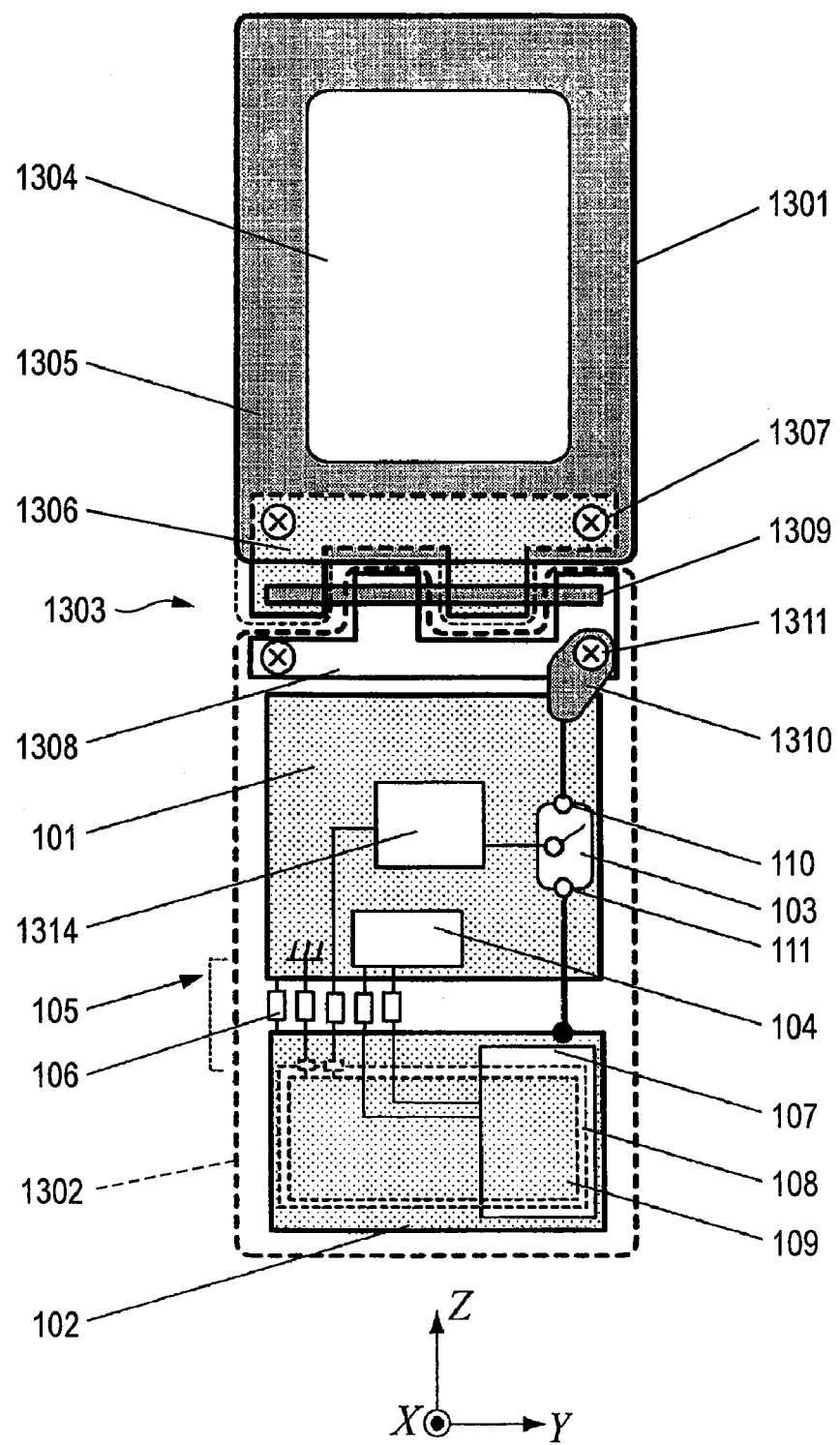
FIG. 1 A front view illustrating an antenna construction according to the first embodiment of the present invention.

101 FIRST CIRCUIT BOARD
102 SECOND CIRCUIT BOARD
103 ANTENNA SWITCHING UNIT
106 INDUCTANCE ELEMENT
108 EXTERNAL POWER SUPPLY
109 ELECTRODE METAL PORTION
201 FLEXIBLE CABLE
204 FIRST CONNECTION LINE
205 SECOND CONNECTION LINE
206 THIRD CONNECTION LINE
501 FOLDER TYPE MOBILE RADIO APPARATUS
801 THIRD CIRCUIT BOARD
802 FOURTH CIRCUIT BOARD
803 ANTENNA ELEMENT
903 GROUND ELEMENT
904 POWER LINE TERMINAL
1001 SENSOR ELEMENT
1002 CONTROL UNIT
1003 DETECTION ELEMENT
1101 SECOND DETECTION ELEMENT
1102 THIRD DETECTION ELEMENT
1201 COMPARISON UNIT
1202 RECEIPT LEVEL DETECTION UNIT
1203 MEMORY UNIT
1301 UPPER CASE
1302 LOWER CASE
1303 HINGE PORTION
1304 DISPLAY ELEMENT
1305 METAL FRAME
1310 FEED TERMINAL
1312 CIRCUIT BOARD
1313 ELECTROSTATIC CIRCUIT
1314 RADIO CIRCUIT
1401 FIRST HIGH FREQUENCY COAXIAL CABLE
1402 SECOND HIGH FREQUENCY COAXIAL CABLE
1403 POWER DIVIDING COMBINER

BEST MODE FOR CARRYING OUT THE INVENTION

Hereinafter, a folder type mobile radio apparatus according embodiments of the present invention will now be described in detail with reference to the accompanying drawings.

In addition, like reference numerals as those of the folder type mobile radio apparatus described in the Background of the Invention denote like elements, whose descriptions will be omitted.

Moreover, the present invention will be described by setting, for example, a radio frequency to 1950 MHz.

First Embodiment

The folder type mobile radio apparatus according to the first embodiment of the present invention will be described in detail with reference to FIGS. 1 to 7.

FIG. 1 is a front view illustrating a basic construction of a folder type mobile radio apparatus according to the first embodiment of the present invention.

As shown in FIG. 1, the folder type mobile radio apparatus according to the first embodiment of the present invention comprises a first circuit board 101, a second circuit board 102, an antenna switching unit 103, a data processing portion 104, a connecting portion 105 for connecting the first circuit board and the second circuit board with each other, and an external memory drive 107 in a lower case 1302.

The first circuit board 101 is a printed board having a thickness of, for example, 1 mm on which circuit elements for implementing various functions of the folder type mobile radio apparatus are mounted. A ground pattern serving as a ground voltage is formed on its almost entire surface. The area of the first circuit board 101 is set to 40 mm×40 mm.

The second circuit board 102 is a printed board having a thickness of 1 mm on which various elements for various functions of the folder type mobile radio apparatus and an external memory drive 107 are mounted. Similar to the first circuit board 101, a ground pattern for providing a ground voltage is formed on its almost entire surface. The area of the second circuit board 102 is set to 30 mm×40 mm.

In addition, an external power supply 108 for driving the folder type mobile radio apparatus is disposed on the second circuit board 102. The area of the external power supply 108 is set to 25 mm×35 mm. The external power supply 108 is disposed with an interval of 2 mm from the second circuit board 102, and includes an electrode metal portion 109 in its inside.

The ground pattern of the second circuit board 102 also operates as an antenna element that uses the first circuit element 101 as a grounding conductor.

The first circuit board 101 and the second circuit board 102 are connected through the connecting portion 105. The interval between the first circuit board 101 and the second circuit board 102 is set to 2 mm or more in order to obtain an isolation of, for example, 20 dB or more.

The connecting portion 105 is constructed of a plurality of connection lines connecting the first circuit board 101 and the second circuit board 102. The connection lines includes, for example, control and data lines connected between the external memory drive 107 and the data processing portion 104, power supply and ground lines connected between the external power supply 108 and the wireless circuit 1314, and the like.

By connecting each connection line between the first circuit board 101 and the second circuit board 102, the isolation between the first circuit board 101 and the second circuit board 102 is significantly degraded. Therefore, an inductance element 106 is provided in each connection line. By providing the inductance element 106, a high frequency signal having a radio frequency of 1950 MHz is cut off while a data signal or a direct current signal of a control system passes.

For this reason, it is possible to obtain a high isolation between the first circuit board 101 and the second circuit board 102 at a radio frequency of 1950 MHz even when the first circuit board 101 and the second circuit board 102 are interconnected by the connecting portion 105.

The inductance value may be differently set depending on the number of the connection lines and the radio frequency. For example, assuming a total of 5 lines including at least one data transmission signal line, at least one control line, and two ground lines are provided, the inductance of the inductance element 106 is set to 470 nH. Since the inductance becomes 1/n if n connection lines are arranged in parallel, a higher inductance is set when the number of connection lines increases.

The inductance element 106 is preferable as smaller as possible, and thus, a chip element having a size of 1.0 mm×0.5 mm×0.5 mm is used.

Figure 2:
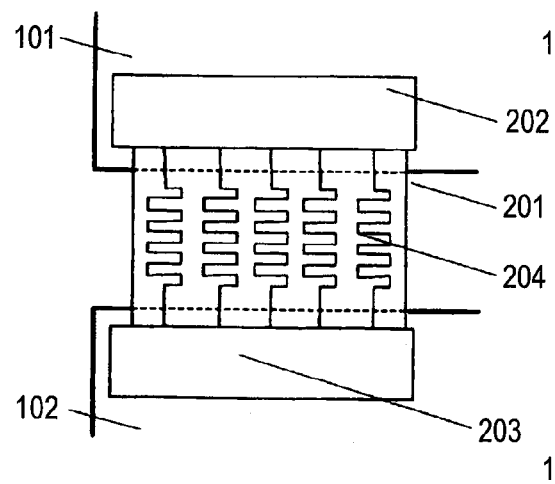
FIG. 2(a), 2(b) An enlarged view illustrating a connecting portion according to the first embodiment of the present invention.
Figure 2:
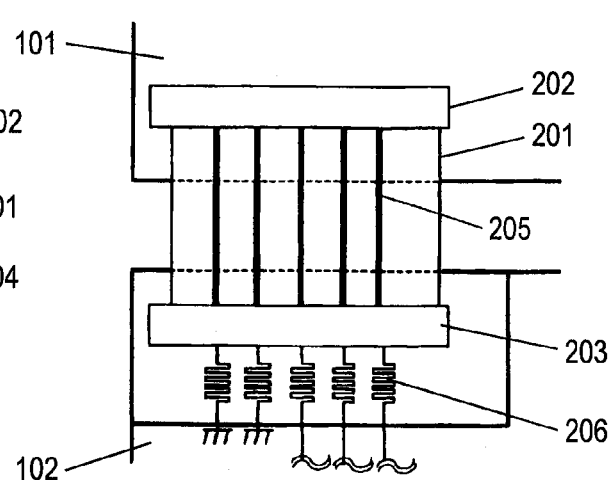

FIG. 2 shows a case that elements other than the chip element are used to construct the inductance of the connection line 105. FIGS. 2(a) and 2(b) show constructions for connecting the first circuit board 101 and the second circuit board 102 with each other by using a flexible cable.

In FIG. 2(a), the flexible cable 201 is connected to the first circuit board 101 through the first connector 202, and connected to the second circuit board 102 through the second connector 203. The first connection line 204 is constructed of a copper foil having a width of 0.35 mm, and has a meander shape in the center of the first connection line 204 so as to set the inductance value.

In addition, FIG. 2(b) shows that the inductance constructed in the center of the first connection line 204 in FIG. 2(a) is incorporated into the second circuit board 102. The second connection line 205 is constructed of a copper foil having a thickness of 0.5 mm, and connected to the second circuit board 102 through the second connector 203. The third connection line 206 constructed on the second circuit board 102 has an inductance value set by the copper foil pattern of the second circuit board 102.

In the vicinity of a portion where the third connection line 206 is disposed on the second circuit board 102, copper foil patterns other than the third connection line 206 are removed. In such a construction, it is possible to obtain equivalent effect as those of the inductance element 106.

Figure 3:
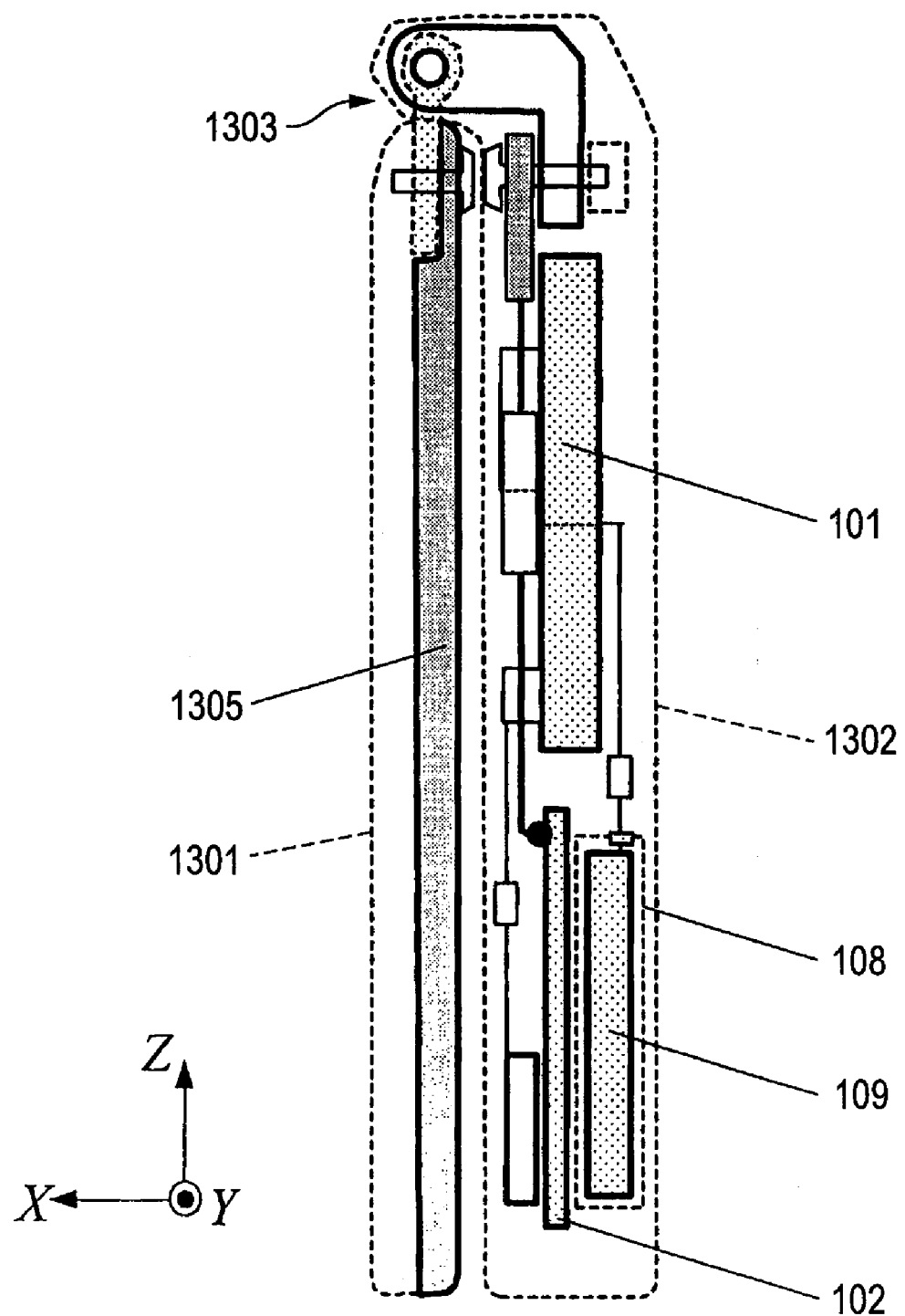
FIG. 3 A side view illustrating an antenna construction when folded according to the first embodiment of the present invention.
Figure 4:
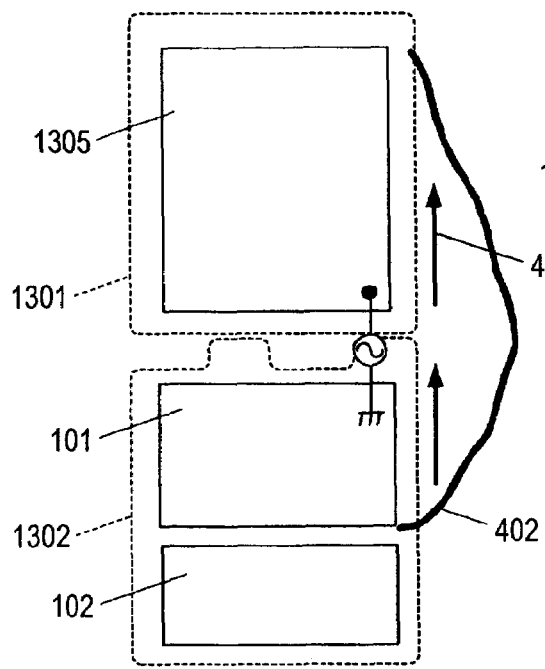
FIGS. 4(a), 4(b), 4(c), & 4(d) A schematic diagram illustrating an operation theory of an antenna according to the first embodiment of the present invention.
Figure 4:
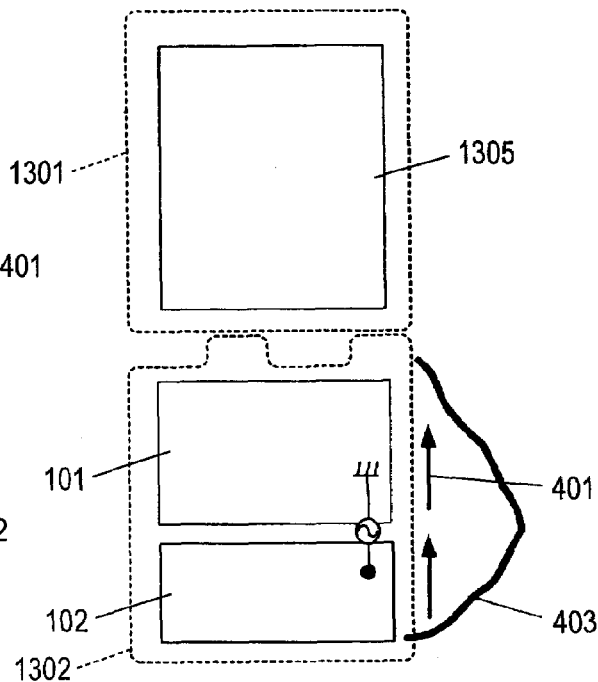
Figure 4:
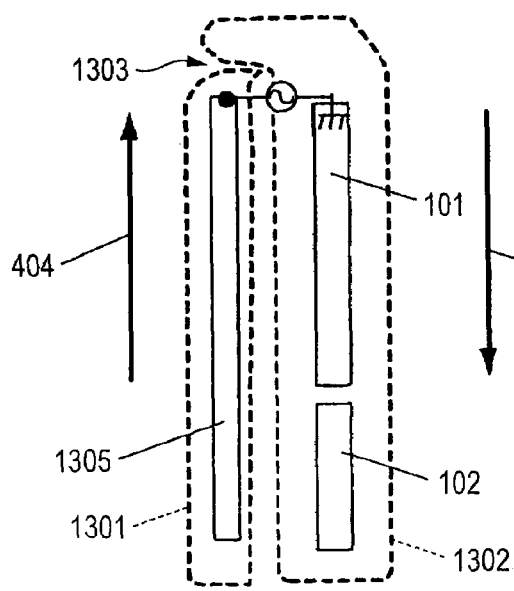
Figure 4:
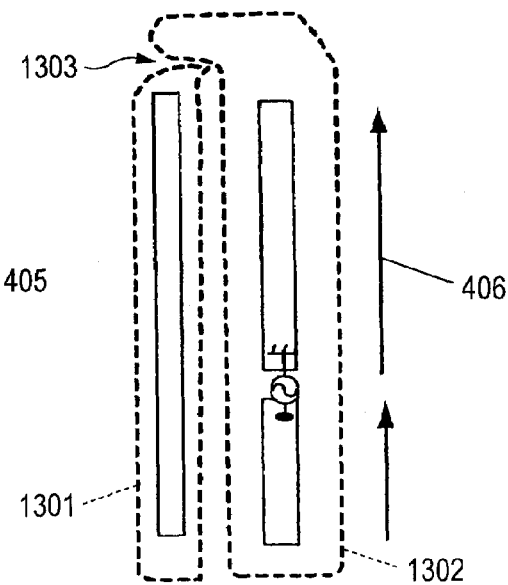

FIG. 3 is a side elevation illustrating a basic construction of a folder type mobile radio apparatus in a folded state according to the first embodiment of the present invention. FIG. 4 is a schematic diagram illustrating folded and unfolded states of a folder type mobile radio apparatus according to the first embodiment of the present invention. Specifically, FIG. 4(a) illustrates a state that the first antenna is selected in an unfolded state, FIG. 4(b) illustrates a state that the second antenna is selected in an unfolded state, FIG. 4(c) illustrates a state that the first antenna is selected in a folded state, and FIG. 4(d) illustrates a state that the second antenna is selected in a folded state.

In this case, an antenna constructed of the first circuit board 101 and the metal frame 1305 constitutes the first antenna, and an antenna constructed of the first circuit board 101 and the second circuit board 102 constitutes the second antenna.

FIG. 4(a) shows a case that the first antenna is selected in an unfolded state. The first antenna has a construction for allowing an area from the first circuit board 101 to the metal frame 1305 to operate as a dipole. On the other hand, FIG. 4(b) shows a case that the second antenna is selected in an unfolded state. The second antenna has a construction for allowing an area from the first circuit board 101 to the second circuit board 102 to operate as a dipole.

The first arrow 401 in FIG. 4(a) indicates a current flow direction in the first antenna. In addition, the first distribution 402 shows a current intensity distribution in the first antenna. Since the first antenna operates as a dipole between the first circuit board 101 and the metal frame 1305, the current directions distributed in the first circuit board 101 and the metal frame 1305 are identical to each other. In addition, the feed part has an intensity distribution having a maximum current intensity. The reason for the different distributions of the current intensity between the first circuit board 101 and the metal frame 1305 is that the length of the metal frame 1305 is larger than λ/4 (about 38 cm) of a frequency of 1950 MHz. In addition, when the first antenna is selected, the current is not distributed on the second circuit board 102.

On the other hand, the second distribution 403 in FIG. 4(b) shows the current intensity distribution in the second antenna. The second antenna operates as a dipole between the first circuit board 101 and the second circuit board 102. Similar to the first antenna, the current directions distributed in the first circuit board and the second circuit board 102 are identical to each other. Although the feed part has an intensity distribution having a maximum current intensity, the electrical current is distributed on the first circuit board 101 and the second circuit board 102 but not distributed on the metal frame 1305 unlike the first antenna. Referring to FIGS. 4(a) and 4(b), the difference between the first antenna and the second antenna is the position of the feed part and the electrical current distribution.

Generally, it is known that the antenna performance is most significantly affected in the vicinity of the feed part when a user's hand is disposed near the antenna. For this reason, in the folder type mobile radio apparatus, if the feed part can be moved in the vicinity of the user's hand depending on the position of the user's hand, it is possible to always obtain safe antenna performance in any holding condition.

FIG. 4(c) shows a folded state of the folder type mobile radio apparatus when the first antenna is selected. In FIG. 4(a), the first arrow 401 indicating the current direction is same on the first circuit 101 and the metal frame 1305. However, in FIG. 4(c), since the folder type mobile radio apparatus is folded in the vicinity of the feed part, the second arrow 404 indicating the current direction on the metal frame 1305 is opposite to the third arrow 405 indicating the current direction of the first circuit board 101, so that the current distributions are compensated.

On the other hand, in FIG. 4(d), since the current is not distributed on the metal frame 1305, the fourth arrows 406 indicating the current directions on the first circuit board 101 and the second circuit board 102 in the state that the second antenna is selected have the same direction. In this case, in comparison with FIG. 4(c), the antenna of FIG. 4(d) obtains excellent antenna performance in a radio frequency of 1950 MHz. In this case, the pattern average gain (PAG) of an X-Z plane becomes −20 dBd and −10 dBd in FIGS. 4(c) and 4(d), respectively, so that the PAG of the FIG. 4(d) is larger than that of FIG. 4(c) as much as about 10 dB. The PAG is obtained by averaging power directivity on one plane (for example, an X-Z plane). Generally, the PAG is used as an antenna evaluation index by defining the PAG of a half-wavelength dipole antenna as 0 dBd.

Figure 5:
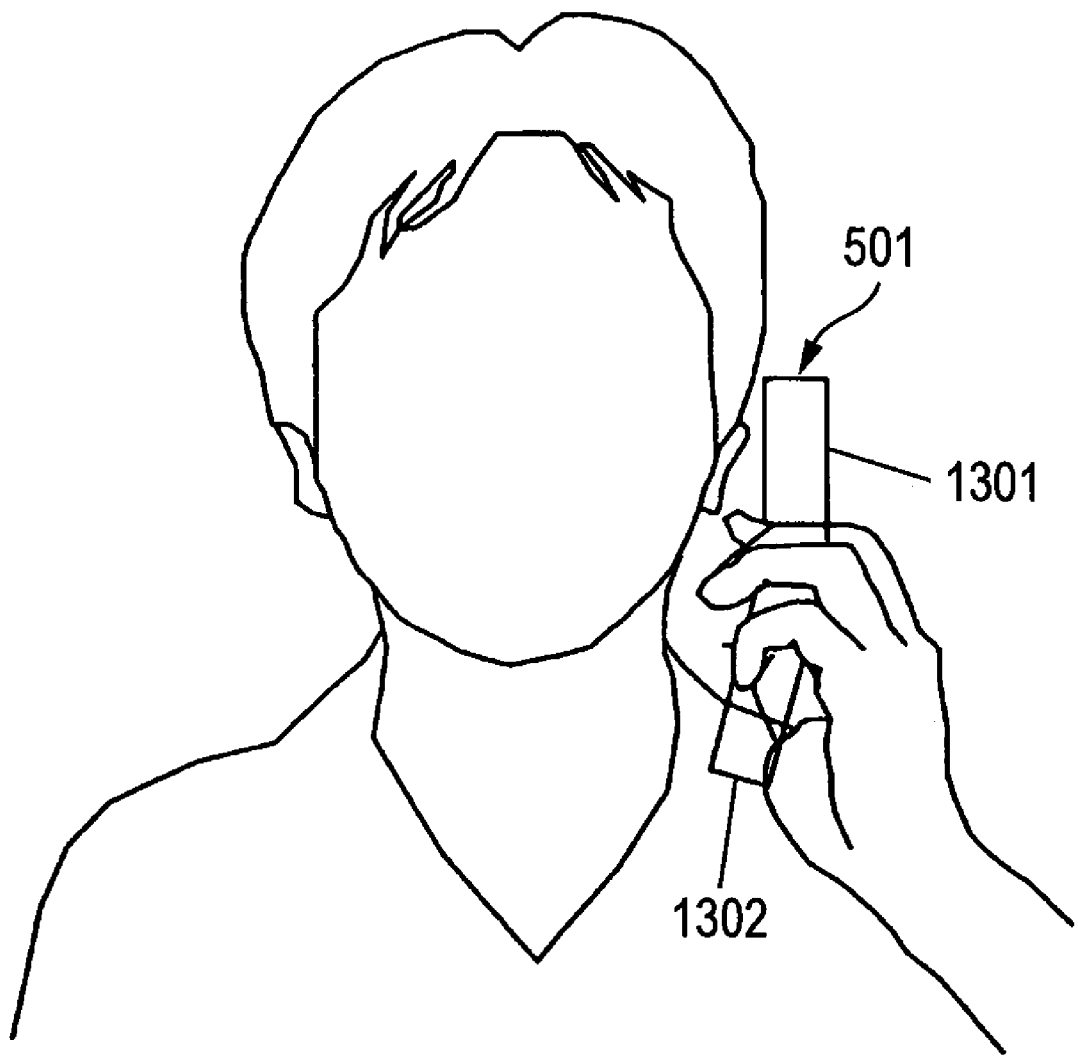
FIG. 5 A diagram illustrating a state when a user holds a mobile radio apparatus by a user's hand for a calling.

FIG. 5 shows a state that a user's hand holds the folder type mobile radio apparatus 501 for a calling (hereinafter, referred to as a calling state), and FIGS. 6(a) to 6(c) schematically show the difference of position of a user's hand when the folder type mobile radio apparatus 501 is held by a user's hand in a calling state. Herein, the coordinate system is set such that the upward direction with respect to a user's position is set to a Z-direction, and a forward direction is set to a X-direction. In addition, FIG. 6(a) shows a case that a user's hand holds a lower portion of the lower case 1302 of the folder type mobile radio apparatus 501 (i.e., a lower-holding condition), FIG. 6(b) shows a case that a user's hand holds the vicinity of a hinge portion 1303 in the center of the folder type mobile radio apparatus 501 (i.e., a center-holding condition), and FIG. 6(c) shows a state that that a user's hand holds the upper case 1301 of the folder type mobile radio apparatus 501 (i.e., an upper-holding condition).

Figure 7:
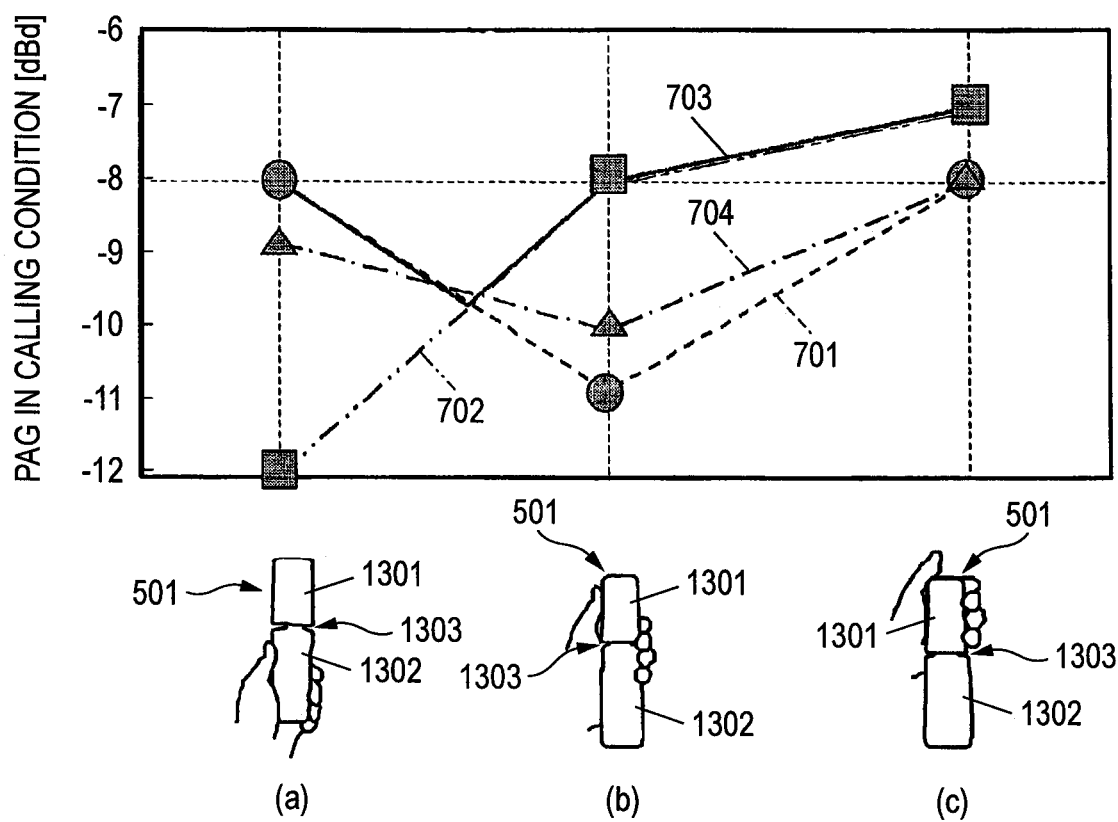
FIG. 7 A graph illustrating gains of a first antenna and a second antenna when a user's hand position for holding a folder type mobile radio apparatus according to the first embodiment of the present invention is changed during a calling.

FIG. 7 shows antenna gains of the first antenna and the second antenna when a user's hand position for holding the folder type mobile radio apparatus according to the first embodiment of the present invention is changed.

In FIG. 7, the dashed line 701 indicates the PAG variation on the X-Y plane of the first antenna, and the two-dotted dashed line 702 indicates the PAG variation on the X-Y plane of the second antenna.

In addition, the solid line 703 indicates an antenna gain variation when a switching between the first antenna and the second antenna is performed based on the user's hand holding position in the folder type mobile radio apparatus according the first embodiment. For the purpose of comparison, the one-dotted dashed line 704 indicates a gain variation of a related antenna. The measurement has been performed in a frequency of 1950 MHz.

As shown in the drawing, the antenna gains of the first antenna and the second antenna, and the related antenna in a lower-holding condition (a) are −8 dBd, −12 dBd, and −9 dBd, respectively. The gain of the first antenna is 4 dB higher than that of the first antenna, and 1 dB higher than that of the related antenna.

On the other hand, the antenna gains in a center-holding condition (b) are −11 dBd, −8 dBd, and −10 dBd, respectively. The gain of the second antenna is 3 dB higher than that of the first antenna, and 2 dB higher than that of the related antenna.

In addition, the antenna gains in an upper-holding condition (c) are −8 dBd, −7 dBd, and −8 dBd, respectively. The gain of the second antenna is 1 dB higher than those of the first antenna and the related antenna.

In this point of view, since the folder type mobile radio apparatus according to the first embodiment of the present invention selects the first antenna in the lower-holding condition (a) and selects the second antenna in the center-holding condition (b) or the upper-holding condition (c), it is possible to improve the antenna gain as much as 1 dB, 2 dB, and 1 dB in each state (a), (b), and (c), respectively, in comparison with the related antenna.

As described above, unlike the related antenna in which only the hinge portion 1303 has a feeding function, the folder type mobile radio apparatus according to the first embodiment of the present invention is constructed to move the antenna feed position depending on the user's holding condition. Therefore, it is possible to reduce the electrical interaction between a user's hand and the antenna generated when a user's hand is disposed near the feed point of the antenna, and obtain excellent antenna performance in any holding condition.

In addition, although the upper case 1301 constructed of a metal frame is exemplified in the first embodiment, it is possible to obtain equivalent antenna performance even when the upper case 1301 is made of a non-conductive material such as a resin if the ground pattern in the upper circuit board or the like can be fed through the hinge portion 1303.

In addition, although the first circuit board 101 is constructed of one layer in the first embodiment, it is possible to obtain equivalent effect even when the circuit board has a multi-layered structure arranged in an X-axis for a compact size if a configuration functioning as a grounding conductor of the antenna element is provided.

Second Embodiment

Figure 8:
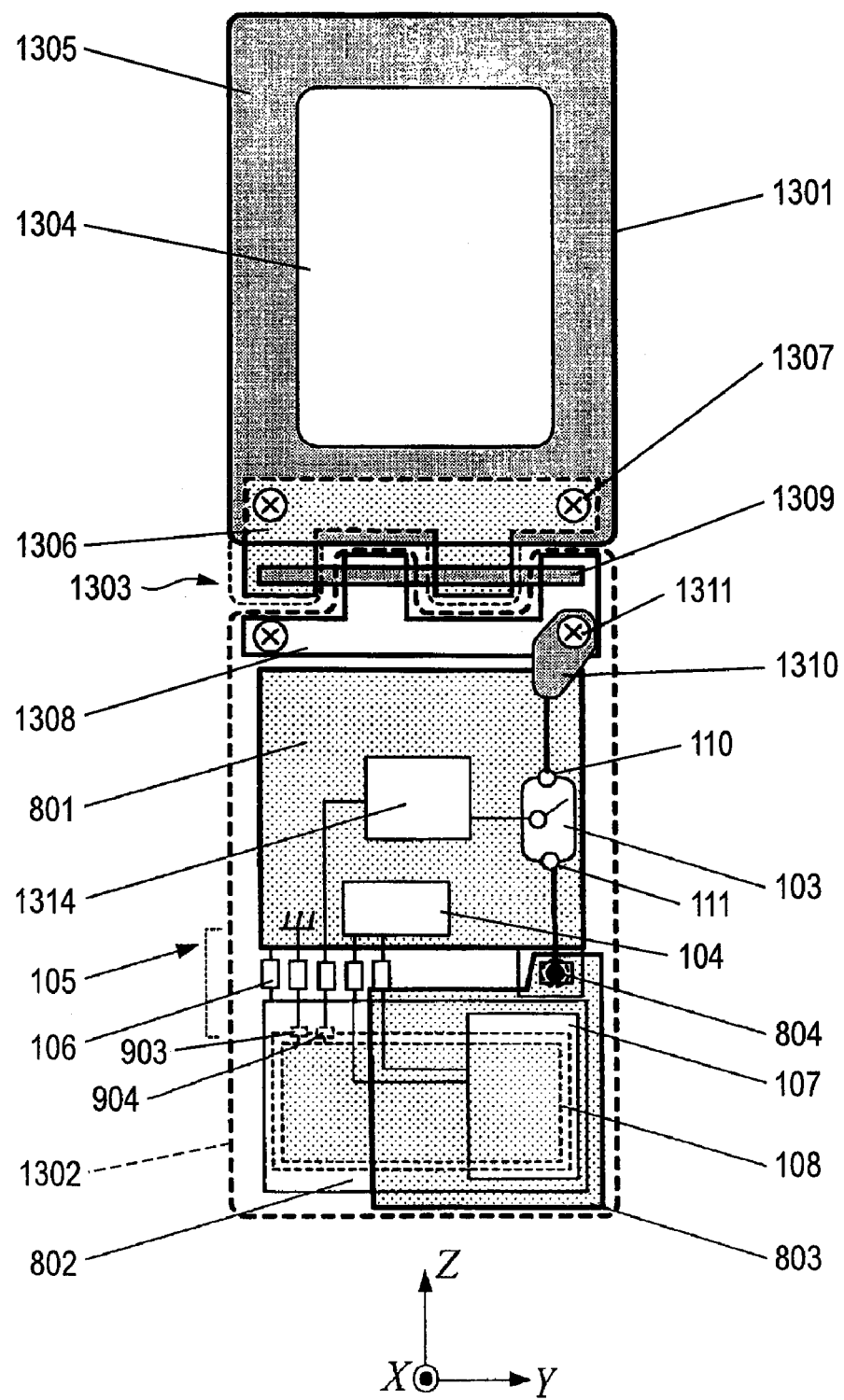
FIG. 8 A front view illustrating an antenna configuration according to a second embodiment of the present invention.

A folder type mobile radio apparatus according to the second embodiment of the present invention will now be described in detail with reference to FIG. 8. FIG. 8 is a front view illustrating a basic construction of a folder type mobile radio apparatus according to the second embodiment of the present invention.

The folder type mobile radio apparatus according to the second embodiment of the present invention relates to an antenna construction in which a circuit board for implementing various functions of the folder type mobile radio apparatus is realized in substantially the same size as that of the first circuit board 101 of the first embodiment.

As shown in FIG. 8, in the folder type mobile radio apparatus according to the second embodiment of the present invention, the lower case 1302 includes a third circuit board 801, a fourth circuit board 802, an antenna element 803, and a connection terminal portion 804.

The third circuit board 801 is a printed board having a thickness of 1 mm, on which all circuit elements for implementing various functions of the folder type mobile radio apparatus are mounted. A ground pattern functioning as a ground voltage of a circuit is provided on its almost entire surface. Its area is set to 45 mm×40 mm.

The fourth circuit board 802 is provided to store an external power supply 108 and an external memory drive 107, and the ground pattern for functioning as a ground voltage of the circuit is not provided thereon. Its area is set to 35 mm×40 mm.

The antenna element 803 and the external power supply 108 are preferably spaced with an interval of 2 mm in order to reduce their interaction. The antenna element 803 is connected to the radio circuit 1314 using the connection terminal portion 804. The connection terminal portion 804 is a metal contact pin having a height in an X-axis direction, and its surface is gold-plated in order to obtain contact stability with the antenna element 803.

In the folder type mobile radio apparatus according to the second embodiment of the present invention, even when the circuit board for implementing various functions of the folder type mobile radio apparatus can be fabricated in a compact size, a metal plate functioning as a new antenna element is added. As a result, similar to the first embodiment, it is possible to select an antenna to be used depending on a user's hand position. Therefore, it is possible to reduce the electrical interaction between a user's hand and the antenna generated when a user's hand is disposed near the feed point of the antenna, and obtain excellent antenna performance in any holding condition.

In addition, although the third circuit board 801 is constructed of one layer in the present embodiment, it is possible to obtain equivalent effect even when the circuit board has a multi-layered structure arranged in an X-axis for a compact size if a configuration functioning as a grounding conductor of the antenna element is provided.

Furthermore, any shape of the antenna element 803 can be used if it has a shape capable of resonating in a desired radio frequency. For example, equivalent effect can be obtained in a linear shape or a meander shape as well as a plate shape.

Third Embodiment

Figure 9:
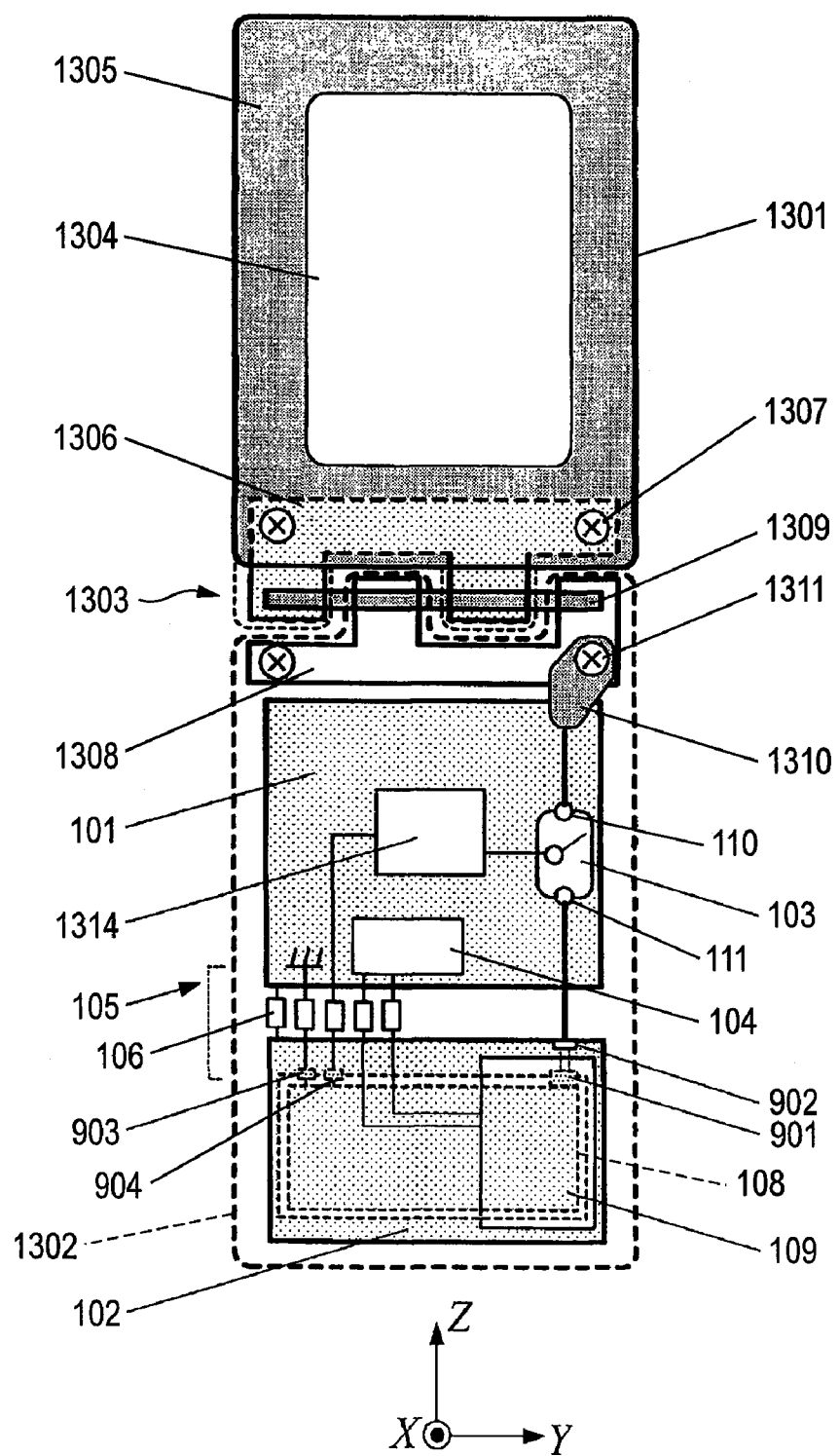
FIG. 9 A front view illustrating an antenna configuration according to a third embodiment of the present invention.

A folder type mobile radio apparatus according to the third embodiment of the present invention will now be described in detail with reference to FIG. 9. FIG. 9 is a front view illustrating a basic construction of a folder type mobile radio apparatus according to the third embodiment of the present invention.

As shown in FIG. 9, according to the third embodiment of the present invention, in the lower case 1302 of the folder type mobile radio apparatus of the first embodiment, the electrode metal portion 109 in a battery is used as an antenna element.

The feed terminal 901 is electrically connected to the electrode metal portion 109 of the battery, and disposed in a symmetrical position with the ground terminal 903 and the power line terminal 904 of the battery across the width of the folder type mobile radio apparatus.

The feed terminal 901 is connected to the radio circuit 1314 through the connection pin 902. The feed terminal 901 is a metal connector connected to the connection pin 902 with a contact pressure. A gold plating is performed on the surfaces of the connection pin 902 and the feed terminal 901 in order to obtain contact safety and erosion resistance. In addition, a lithium ion battery is typically used to supply an external voltage in portable devices. For this reason, it is possible to construct an antenna connected between the first circuit board 101 and the electrode terminal portion 109 in the battery.

According to the folder type mobile radio apparatus of the third embodiment of the present invention, the electrode metal portion 109 in the battery disposed in a lower side of the lower case 1302 in the folder type mobile radio apparatus is used as an antenna element. Therefore, similar to the first embodiment, it is possible to select an antenna to be used depending on a user's hand position. Therefore, it is possible to reduce the electrical interaction between a user's hand and the antenna generated when a user's hand is disposed near the feed point of the antenna, and obtain excellent antenna performance in any holding condition.

In addition, although the first circuit board 101 is constructed of one layer in the present embodiment, it is possible to obtain equivalent effect even when the circuit board has a multi-layered structure arranged in an X-axis for a compact size if a configuration functioning as a grounding conductor of the antenna element is provided.

Furthermore, although a lithium ion battery is exemplified as an external power supply in the present embodiment, it is possible to obtain equivalent effect even when any material is used as the external power supply because a material is covered with a metal body.

Fourth Embodiment

A folder type mobile radio apparatus according to the fourth embodiment of the present invention will now be described in detail with reference to FIG. 10.

Figure 10:
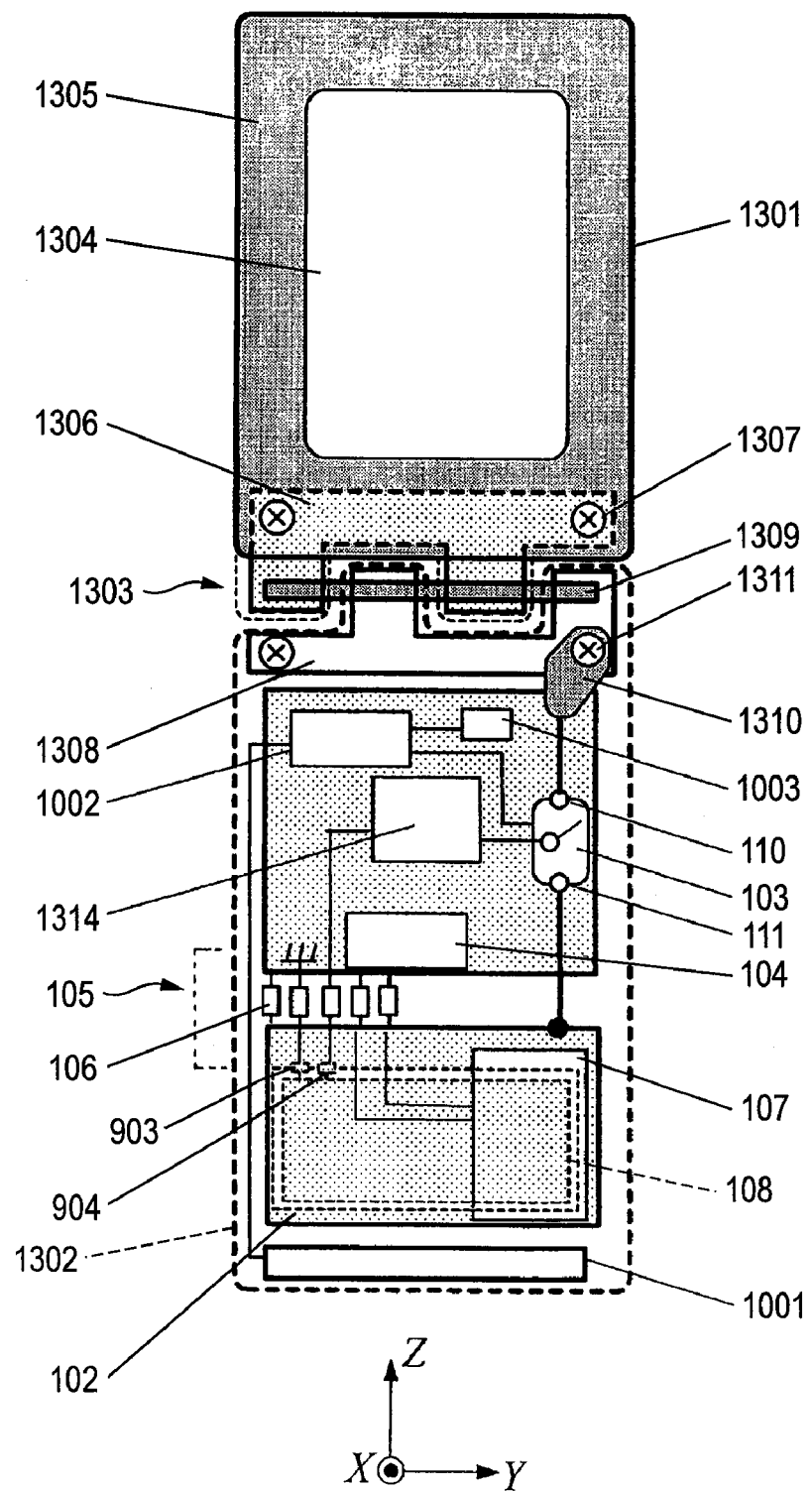
FIG. 10 A front view illustrating an antenna configuration according to a fourth embodiment of the present invention.

As shown in FIG. 10, the folder type mobile radio apparatus according to the fourth embodiment of the present invention includes a sensor element 1001 for sensing a user's hand, a control unit 1002, and a detection element 1003 for detecting a folded or unfolded condition of the folder type mobile radio apparatus.

In the present embodiment, the first antenna is used when a user's hand is sensed by the sensor element 1001. On the contrary, the second antenna is used when a user's hand is not sensed by the sensor element 1001.

The sensor element 1001 is a flexible pressure sensor constructed of a metal electrode and a resin. The sensor element 1001 having a thickness of 0.5 mm is used by attaching it to a resin of a lower end portion of the lower case 1302.

In the lower-holding condition as shown in FIG. 6(a), a user's hand touches the sensor element 1001. In this case, the sensor element 1001 outputs a sense signal to the control unit 1002 to inform that a user's hand is disposed near the sensor. The control unit 1002 controls the antenna switching unit 103 based on the sense signal from the sensor element 1001. In this case, the antenna switching unit 103 connects the radio circuit 1314 with the first terminal 110 to constitute the first antenna.

On the other hand, in the center-holding condition or the upper-holding condition as shown in FIGS. 6(b) and 6(c), respectively, a user's hand does not touch the sensor element 1001. Therefore, the sensor element 1001 does not output the sense signal. In this case, the antenna switching unit 103 connects the radio circuit 1314 with the second terminal 111 to constitute a second antenna.

In addition, the detection element 1003 is a hall effect sensor for detecting magnetic flux change to detect whether or not metal is disposed near. If the folder type mobile radio apparatus according to the present embodiment is in a folded condition, the detection element 1003 detects that the metal frame 1305 is disposed near, and outputs a detection signal to the control unit 1002. The control unit 1002 allows the antenna switching unit 103 to connect the radio circuit 1314 with the terminal 111 regardless of the output result of the detection element 1003 when the folder type mobile radio apparatus is in a folded condition. For this reason, when the folder type mobile radio apparatus according to the present embodiment is in a closed condition, the second antenna is selected.

Unlike the related antenna in which only the hinge portion 1303 has a feed function, the folder type mobile radio apparatus according to the fourth embodiment of the present invention is constructed to move the feed position of the antenna depending on a user's holding condition. Therefore, it is possible to reduce the electrical interaction between a user's hand and the antenna generated when a user's hand is disposed near the feed point of the antenna, and obtain excellent antenna performance in any holding condition. In addition, since a folding/unfolding detection means such as the detection element 1003 is provided, it is possible to obtain excellent antenna performance by selecting an optimal antenna even when the folder type mobile radio apparatus is folded after one antenna is selected in an unfolded condition.

Although, in the present embodiment, a pressure sensor is used as an example of a sensor element 1001 for sensing a user's hand, it is possible to obtain equivalent antenna performance by using other elements such as an electrostatic sensor, an infrared sensor, a temperature sensor, and a humidity sensor if it can detect any change generated when a user's hand is disposed near.

Figure 11:
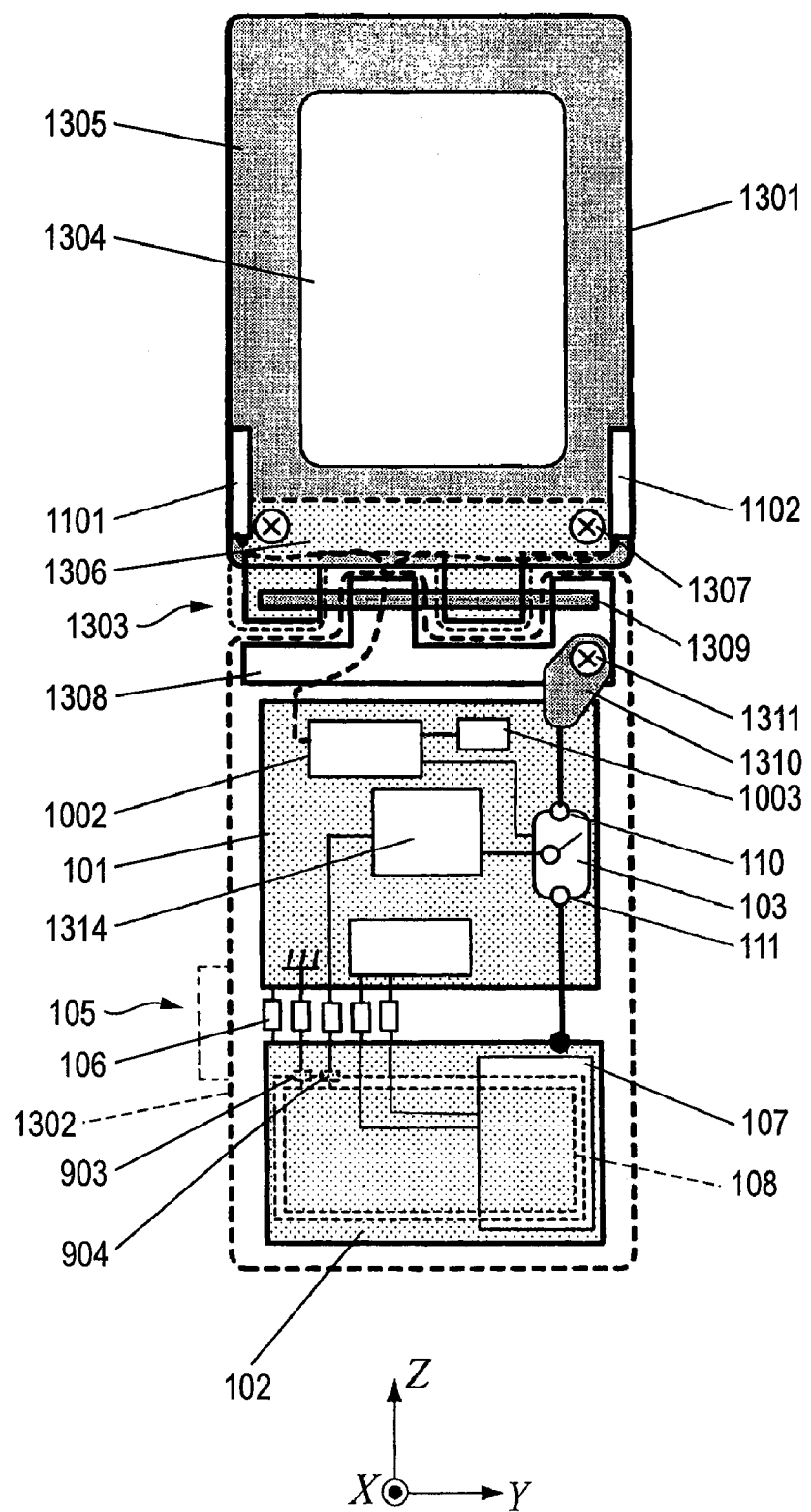
FIG. 11 A front view illustrating an antenna configuration according to the fourth embodiment of the present invention.

In addition, although the sensor element 1001 is disposed in a lower end of the lower case 1302 in the present embodiment, it is possible obtain equivalent antenna performance by arranging the sensor(s) in other position(s), for example, arranging the second and third sensor elements 1101 and 1102 in both sides of the upper case 1301 near the hinge portion 1303 as shown in FIG. 11 if they can detect any change generated when a user's hand is disposed near.

Furthermore, although the upper case 1301 is constructed of a metal frame in the present embodiment, it is possible to obtain equivalent antenna performance by using other constructions, such as a construction capable of feeding the ground pattern of the upper circuit board and the like through the hinge portion 1303, even when the upper case 1301 is made of a non-conductive material such as a resin.

Fifth Embodiment

A folder type mobile radio apparatus according to the fifth embodiment of the present invention will now be described in detail with reference to FIG. 12.

Figure 12:
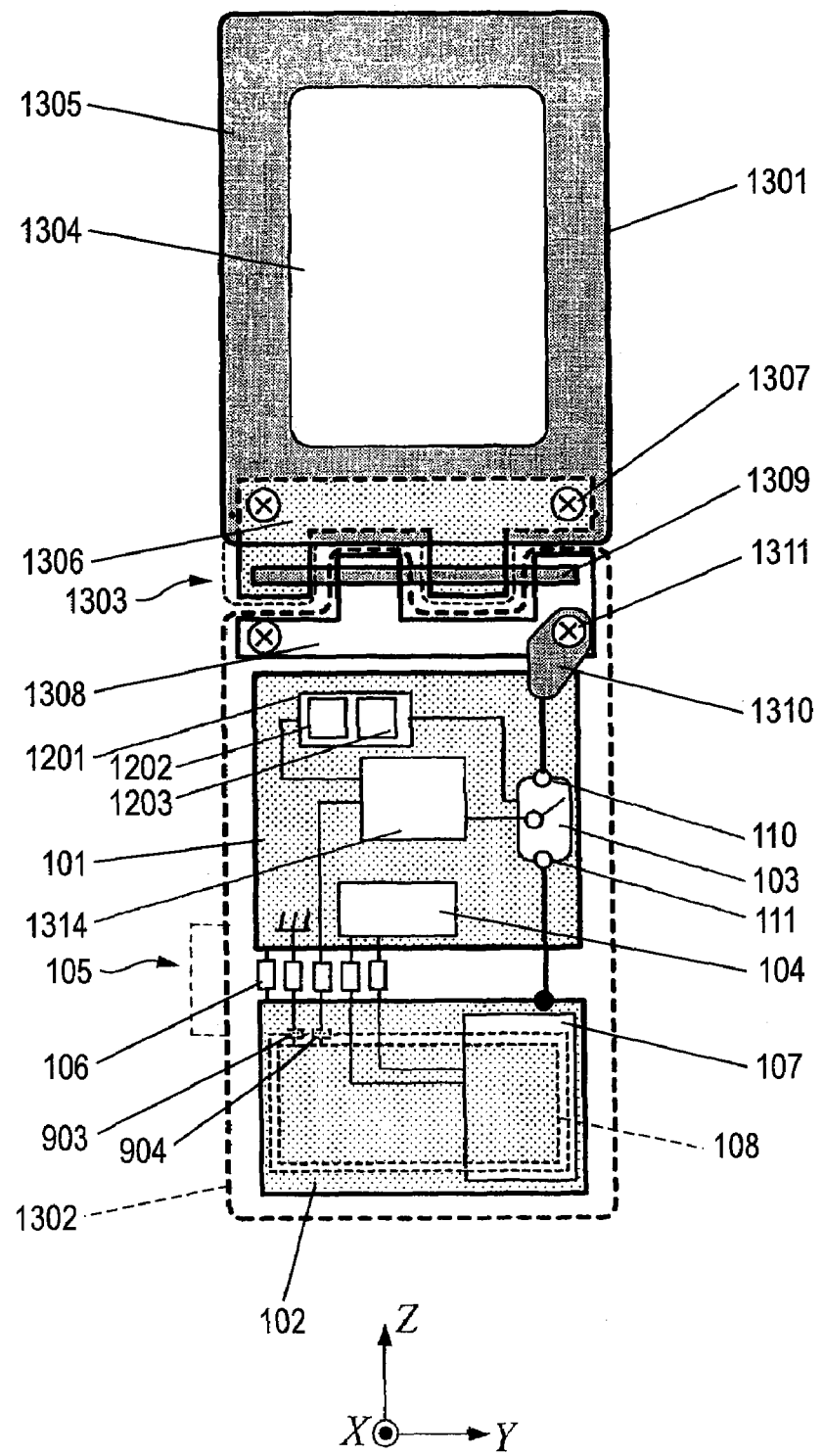
FIG. 12 A front view illustrating an antenna configuration according to a fifth embodiment of the present invention.

As shown in FIG. 12, the folder type mobile radio apparatus according to the fifth embodiment of the present invention includes a receipt level detection unit 1201 for detecting the received electric field intensity, a memory unit 1203 provided in the receipt level detection unit 1201, and a comparison unit 1201.

In addition, in this folder type mobile radio apparatus, the received electrical field intensity is once stored in the memory unit 1203 in the receipt level detection unit 1201, for example, in a state that the radio circuit 1314 is connected to the first terminal 110 (i.e., when the first antenna is selected). Then, a switching is performed such that the radio circuit 1314 is connected to the terminal 111 (i.e., when the second antenna is selected). The received electric field intensity when the second antenna is selected is compared with the received electric field intensity stored in the memory unit 1203 by using the comparison unit 1202. Based on the detection result from the comparison unit 1202, the receipt level detection unit 1201 controls the antenna switching unit 103 so that the antenna having a highest received electric intensity level can be always selected.

The folder type mobile radio apparatus according to the fifth embodiment of the present invention includes a construction for moving the feed position of the antenna based on a user's holding condition without using the detection element for detecting a user's hand position. Therefore, it is possible to reduce the electrical interaction between a user's hand and the antenna generated when a user's hand is disposed near the feed point of the antenna, and obtain excellent antenna performance in any holding condition.

In addition, it is possible to always set up an optimal antenna for a usage condition as well as a user's holding condition, and it is possible to always obtain safe antenna performance.

Furthermore, although the received electric field intensity is used as a comparison index for switching an antenna in the present embodiment, it is possible to obtain equivalent antenna performance by using other indices such as a bit error rate (BER) if it can evaluate radio performance when the first or second antenna is selected.

Sixth Embodiment

A folder type mobile radio apparatus according to the sixth embodiment of the present invention will now be described in detail with reference to FIG. 13.

Figure 13:
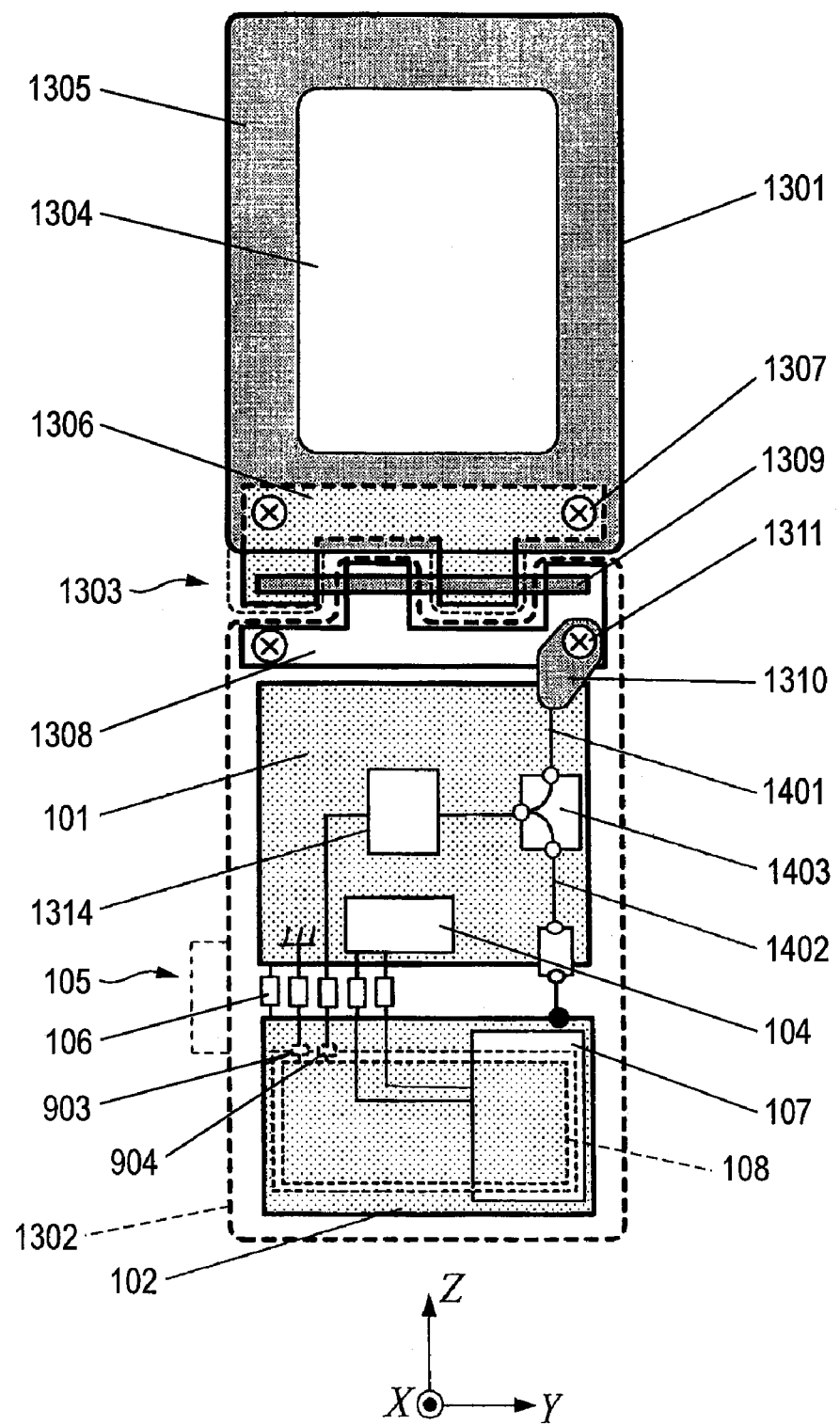
FIG. 13 A front view illustrating an antenna configuration according to a sixth embodiment of the present invention.
Figure 14:
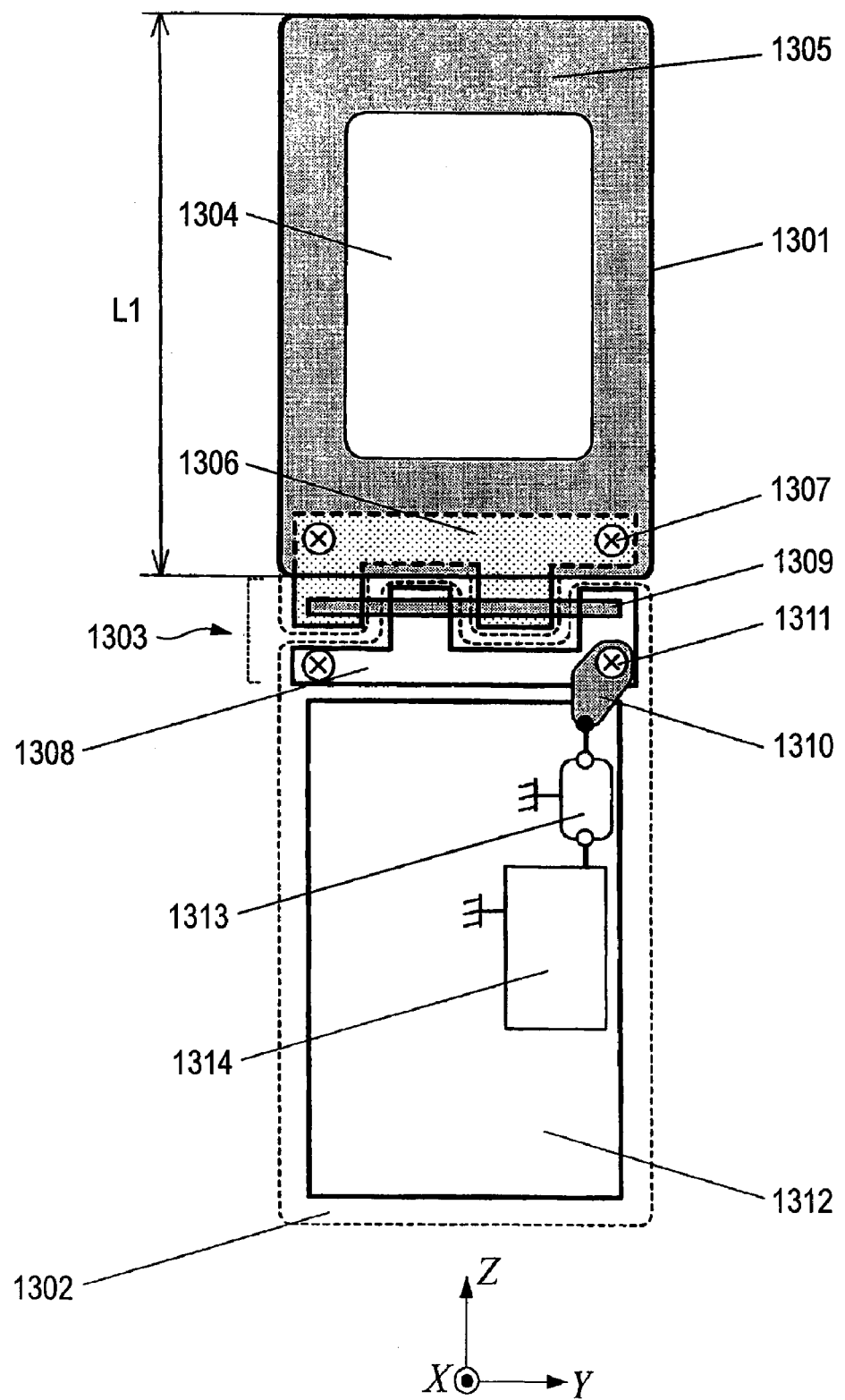
FIG. 14 A schematic front view illustrating a folder type mobile radio apparatus having a related antenna construction.

As shown in FIG. 13, the folder type mobile radio apparatus according to the sixth embodiment simultaneously feeds the first antenna and the second antenna by using a power divider circuit.

The first antenna and the second antenna are connected to the power dividing combiner 1403 and the radio circuit 1314 through radio-frequency coaxial cables 1401 and 1402, respectively. The power dividing combiner 1403 may be, for example, a Wilkinson power divider.

Figure 6:
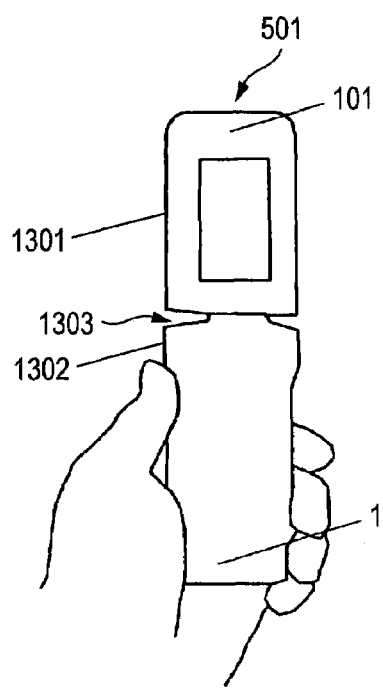
FIGS. 6(a), 6(b) & 6(c) A diagram illustrating a holding condition of a folder type mobile radio apparatus.
Figure 6:
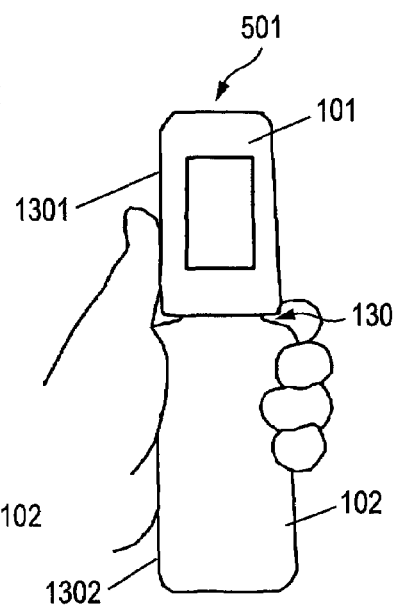
Figure 6:
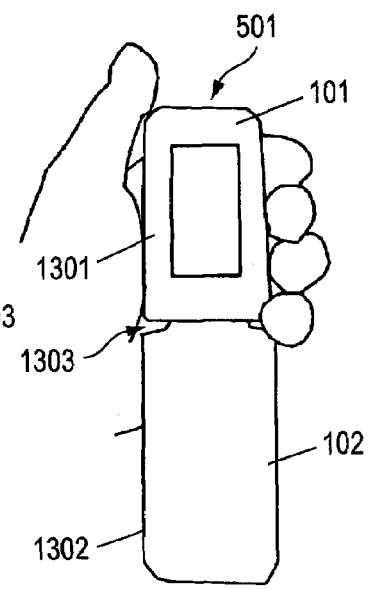

In this case, according to the present embodiment, the antenna gain becomes −8.5 dBd in a lower-holding state (refer to FIG. 6(*a*)). On the other hand, the antenna gain becomes −9 dBd in a center-holding condition (refer to FIG. 6(*b*)), or −8 dBd in a lower-holding state (refer to FIG. 6(*c*)). Although these gains are relatively lower in comparison with the gains −8 dBd, −7 dBd, and −7 dBd that have been obtained by using the antenna switching means, it is possible to obtain antenna performance quite similar to the them.

In addition, in comparison with the related antenna, it is possible to improve antenna performance as much as 0.5 dB to 1.0 dB in various holding conditions such as a lower-holding condition, a center-holding condition, and an upper-holding condition (refer to FIGS. 6(*a*), 6(*b*), and 6(*c*)).

In the folder type mobile radio apparatus according to the sixth embodiment of the present invention, both of the first antenna and the second antenna are simultaneously fed. Therefore, it is possible to obtain a high antenna gain without performing an antenna switching operation even when a user's hand holding condition is changed.

In addition, the power dividing combiner is not limited to the Wilkinson power divider, but other power dividers having a bidirectional property may provide equivalent effect.

Furthermore, the feed line used in the feeding system is not limited to the radio-frequency coaxial cable, but other transmission lines such as a microstrip line formed on the circuit board may be used.

Although the present invention has been described in detail with reference to particular embodiments, it may be apparent to those skilled in art that various modifications or changes can be made without departing from the concept or the scope of the present invention.

This application claims the benefit of Japanese Patent Application No. 2004-358664, filed on Dec. 10, 2004, the disclosure of which is incorporated herein in its entirety by reference.

INDUSTRIAL APPLICABILITY

The present invention is useful for obtaining excellent antenna performance in any calling condition of a folder type mobile radio apparatus.

The invention claimed is:

1. A folder type mobile radio apparatus comprising:
   a first antenna element provided in a first casing;
   a second casing pivotably connected to the first casing through a hinge portion;
   a circuit board having a ground pattern provided in an end side, which is near the hinge portion, of the second casing;
   a second antenna element provided in another end side, which is opposite to the hinge portion, of the second casing;
   a first feed unit which feeds the first antenna element from a radio circuit on the circuit board;
   a second feed unit which feeds the second antenna element from the radio circuit on the circuit board; and
   a switching unit which selects one of the first feed means unit and the second feed unit,
   wherein the first antenna element and the ground pattern on the circuit board operate as a dipole antenna when the first feed unit is selected, and
   wherein the second antenna element and the ground pattern on the circuit board operate as a dipole antenna when the second feed unit is selected.

2. The folder type mobile radio apparatus according to claim 1,
   wherein the ground pattern on the circuit board is disposed in a hinge portion side of the second casing with substantially a half area of the second casing, wherein the second antenna element is disposed in an opposite side from the hinge portion of the second casing with substantially a half area of the second casing, and wherein the second antenna element is spaced from the ground pattern on the circuit board with a predetermined interval, and electrically connected to the second feed unit on the circuit board.

3. The folder type mobile radio apparatus according to claim 1, wherein the hinge portion includes a first hinge portion and a second hinge portion comprising conductive metal, and a connecting portion for electrically connecting and pivotably supporting the first hinge portion and the second hinge portion, wherein the first hinge portion is provided in the first casing, and electrically connected to an end of the first antenna element, wherein the second hinge portion is provided in the second casing, spaced from the ground pattern on the circuit board with a predetermined interval, and electrically connected to the first feed unit on the circuit board, and wherein the first antenna element, the hinge portion, and the ground pattern on the circuit board operate as a dipole antenna when the first feed unit is selected.

4. The folder type mobile radio apparatus according to claim 1, wherein the second antenna element comprises a copper foil pattern on the circuit board.

5. The folder type mobile radio apparatus according to claim 1, wherein, in the second casing, an inductance element is inserted into a circuit for connecting an electronic circuit provided in a circuit board side to an electronic circuit provided in a second antenna element side, and wherein the inductance element is arranged in an interval between the ground pattern on the circuit board and the second antenna.

6. The folder type mobile radio apparatus according to claim 1, further comprising a folding/unfolding unit which detects a folded/unfolded condition of the first casing and the second casing, wherein the switching means unit is controlled based on a detection result from the folding/unfolding detection unit, wherein the first feed unit is selected when the first casing and the second casing are unfolded, and wherein the second feed unit is selected when the first casing and the second casing are folded.

7. The folder type mobile radio apparatus according to claim 1, further comprising a holding position detection unit which detects a positional relation between the second casing and a user's hand holding the mobile radio apparatus, wherein the switching unit is controlled based on a detection result from the holding position detection unit, wherein the first feed unit is selected when the second antenna element side is held by a hand, and wherein the second feed unit is selected when the hinge portion side is held by a hand.

8. The folder type mobile radio apparatus according to claim 7, further comprising a folding/unfolding unit which detects a folded/unfolded condition of the first casing and the second casing, wherein the switching unit is controlled based on a detection result from the folding/unfolding detection unit, and wherein one of the first feed unit and the second feed unit is forcibly selected when the first casing and the second casing are folded.

9. The folder type mobile radio apparatus according to claim 7, further comprising one of an optical sensor, a temperature sensor, or an electrostatic sensor as the holding position detection unit.

10. The folder type mobile radio apparatus according to claim 1, wherein a feed unit having higher transmission quality is selected by comparing transmission quality in a case in which the first feed unit is selected with a case in which the second feed unit is selected as a method of controlling the switching unit.

11. The folder type mobile radio apparatus according to claim 10, wherein a feed unit having a higher received electric field intensity is selected by comparing a received electric field intensity in a case in which the first feed unit is selected with a case in which the second feed unit is selected as a method of controlling the switching unit.

12. The folder type mobile radio apparatus according to claim 1, further comprising a dividing unit which divides electric power to feed the first feed unit and the second feed unit.

* * * * *